United States Patent
Yoshinaga (10) Patent No.: US 12,017,853 B2
(45) Date of Patent: Jun. 25, 2024

(54) ARTICLE TRANSPORT VEHICLE (71) Applicant: Daifuku Co., Ltd., Osaka (JP)

(72) Inventor: Kazuharu Yoshinaga, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 763 days.

(21) Appl. No.: 17/253,876

(22) PCT Filed: Jun. 13, 2019

(86) PCT No.: PCT/JP2019/023493
§ 371 (c)(1),
(2) Date: Dec. 18, 2020

(87) PCT Pub. No.: WO2019/244768
PCT Pub. Date: Dec. 26, 2019

(65) Prior Publication Data
US 2021/0130096 A1    May 6, 2021

(30) Foreign Application Priority Data

Jun. 19, 2018   (JP) ................................ 2018-116406

(51) Int. Cl.
G06F 7/00      (2006.01)
B65G 1/137     (2006.01)
G06K 7/14      (2006.01)

(52) U.S. Cl.
CPC ......... B65G 1/1375 (2013.01); G06K 7/1413 (2013.01)

(58) Field of Classification Search
CPC ............. B65G 1/1375; B65G 2209/06; B65G 1/0492; B65G 1/1371; G06K 7/1413; G06K 7/14; G06K 19/06009

USPC .................................. 700/213-214, 223-224
See application file for complete search history.

(56) References Cited

U.S. PATENT DOCUMENTS

| | | | |
|---|---|---|---|
| 5,326,217 A | 7/1994 | Simpson et al. | |
| 2015/0073589 A1 | 3/2015 | Khodl et al. | |
| 2016/0271800 A1* | 9/2016 | Stubbs | B25J 9/1666 |
| 2019/0217478 A1* | 7/2019 | Johnson | B25J 9/1697 |

FOREIGN PATENT DOCUMENTS

| | | |
|---|---|---|
| CN | 103569573 A | 2/2014 |
| CN | 105637544 A | 6/2016 |
| DE | 202007010159 U1 | 1/2009 |

(Continued)

*Primary Examiner* — Yolanda R Cumbess
(74) *Attorney, Agent, or Firm* — The Webb Law Firm (57) ABSTRACT

When an article transport vehicle is used to collect articles from a plurality of storing units for storing the articles, an operator who has taken out an article from a storing unit is appropriately identified. The article transport vehicle includes: a traveler (11) that travels to set positions that are set in correspondence with a plurality of storing units (1) for storing the articles (B); a supporter (12) that supports the article (B) taken out from the storing unit (1) by an operator (M); and an identification information reader (4) that reads identification information (MID) of the operator (M). The identification information (MID) is held in an identification information holder (T) that is attached to a foot of the operator (M), and the identification information reader (4) is provided below the supporter (12) on a side (U2) on which the operator (M) puts the article (B) into the supporter (12).

8 Claims, 7 Drawing Sheets

(56) References Cited

FOREIGN PATENT DOCUMENTS

| | | |
|---|---|---|
| JP | 2000142928 A | 5/2000 |
| JP | 2003104520 A | 4/2003 |
| JP | 200652028 A | 2/2006 |
| JP | 2008247546 A | 10/2008 |
| JP | 2009137748 A | 6/2009 |
| JP | 201431262 A | 2/2014 |
| JP | 2016175715 A | 10/2016 |
| KR | 20140021962 A | 2/2014 |
| WO | 2015035300 A1 | 3/2015 |

* cited by examiner

Fig.9

ARTICLE TRANSPORT VEHICLE

CROSS-REFERENCE TO RELATED APPLICATIONS

This application is the United States national phase of International Application No. PCT/JP2019/023493 filed Jun. 13, 2019, and claims priority to Japanese Patent Application No. 2018-116406 filed June 19, 2018, the disclosures of which are hereby incorporated by reference in their entirety.

BACKGROUND OF THE INVENTION

Field of the Invention

The present invention relates to an article transport vehicle for collecting articles from a plurality of storing units for storing the articles.

Description of Related Art

JP 2008-247546A (Patent Document 1) discloses a picking facility including a picking work cart (1) that collects articles picked from a storage shelf (3) into a container for each sorting destination such as a store (In Background Art, symbols in parentheses are those of the reference document.). In this facility, the operator pushes the picking work cart (1) and moves it along the storage shelf (3) including a plurality of storing units (5) in which different items are stored. Then, based on designation by a terminal (21) provided on the picking work cart (1), the operator takes out an article from the storing unit (5) and stores it in a container (8) of the picking work cart (1). A container (8) is provided for each sorting destination, so that the articles are collected for each sorting destination.

When collecting the articles, erroneous picking may occur in which the operator takes out the wrong article from a storing unit. In such a case, it is preferred that the occurrence of erroneous picking is appropriately fed back to the operator to prevent recurrence. To achieve this, it is preferred that the operator who performed the picking operation can be easily identified.

Patent Document 1: JP 2008-247546A

SUMMARY OF THE INVENTION

In view of the above background, it is desired to provide a technique for appropriately identifying the operator who has taken out an article from a storing unit when collecting articles from the storing units for storing the articles by using the article transport vehicle.

As one aspect, an article transport vehicle in view of the above includes: a traveler configured to travel to set positions that are set in correspondence with a plurality of storing units for storing articles; a supporter configured to support an article taken out from one of the storing units by an operator; and an identification information reader configured to read identification information of the operator. The identification information is held in an identification information holder that is attached to a foot of the operator, and the identification information reader is provided below the supporter on a side on which the operator puts the article into the supporter.

Depending on the section of the body of the operator to which the identification information holder is attached, the standing position and movement of the operator may be constrained in order to ensure that the identification information reader reads the identification information, which may reduce work efficiency. Further, depending on the size and shape of the identification information holder, the identification information holder may interfere with the movement of the operator. Since the identification information holder is attached to the foot of the operator as in this configuration, it can be less likely to interfere with the task of the operator. Further, according to this configuration, the identification information reader is provided near the foot of the operator, below the supporter, and on the side on which the operator puts the article into the supporter. Therefore, the operator can have the identification information reader read the identification information without reducing the efficiency of the task of taking out the article from the storing unit and putting the article in the supporter. As described above, according to this configuration, since the identification information of the operator can be read without reducing the work efficiency, when articles are collected from the storing units for storing the articles by using the article transport vehicle, the operator who has taken out an article from the storing unit can be appropriately identified.

Further features and advantages of the article transport vehicle will be apparent from the following description of embodiments described with reference to the drawings.

DETAILED DESCRIPTION OF PREFERRED EMBODIMENTS

Figure 1:
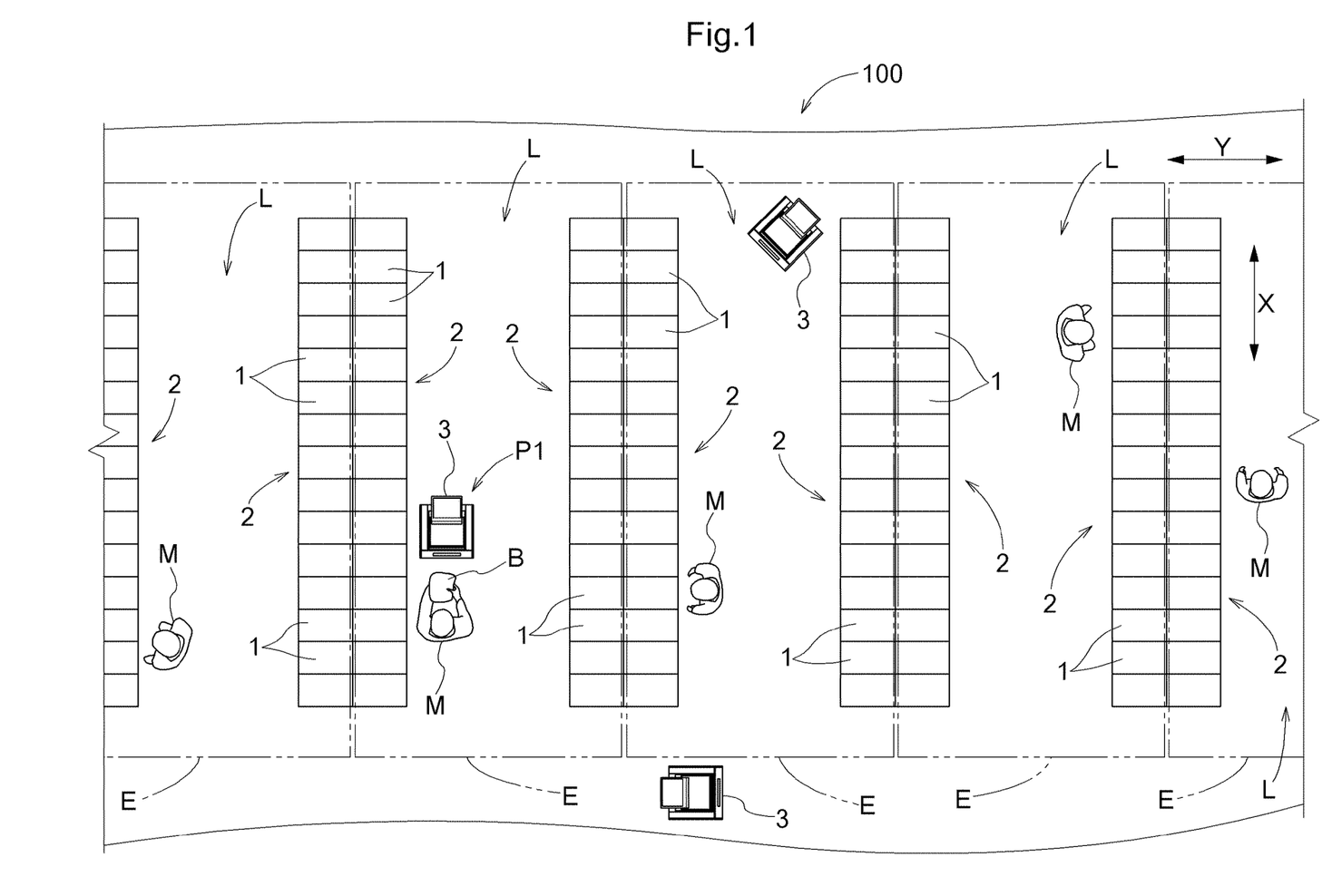
FIG. 1 is a plan view of a picking facility.
Figure 2:
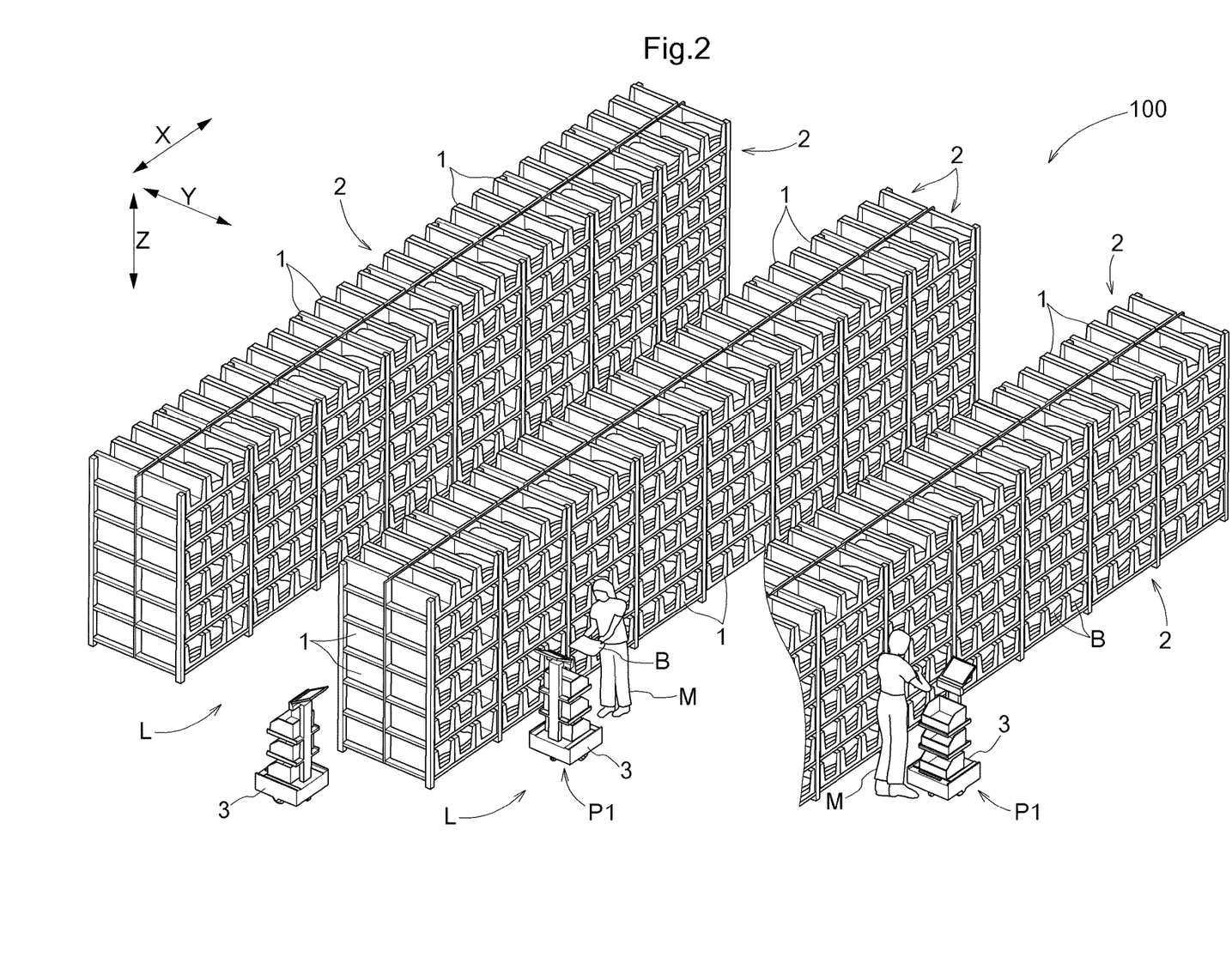
FIG. 2 is a perspective view of the picking facility.
Figure 3:
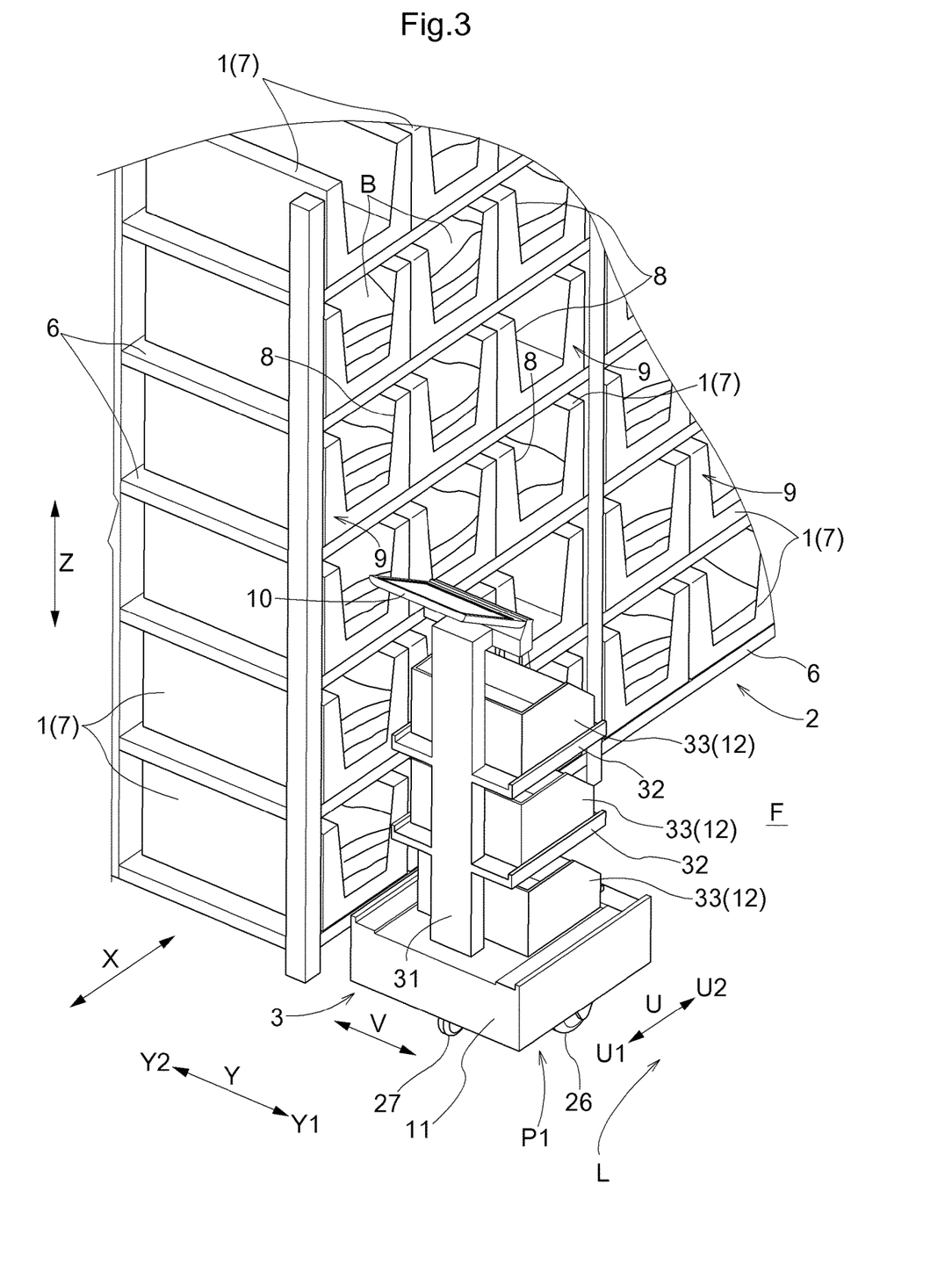
FIG. 3 is an enlarged perspective view of the picking facility and an article transport vehicle.
Figure 4:
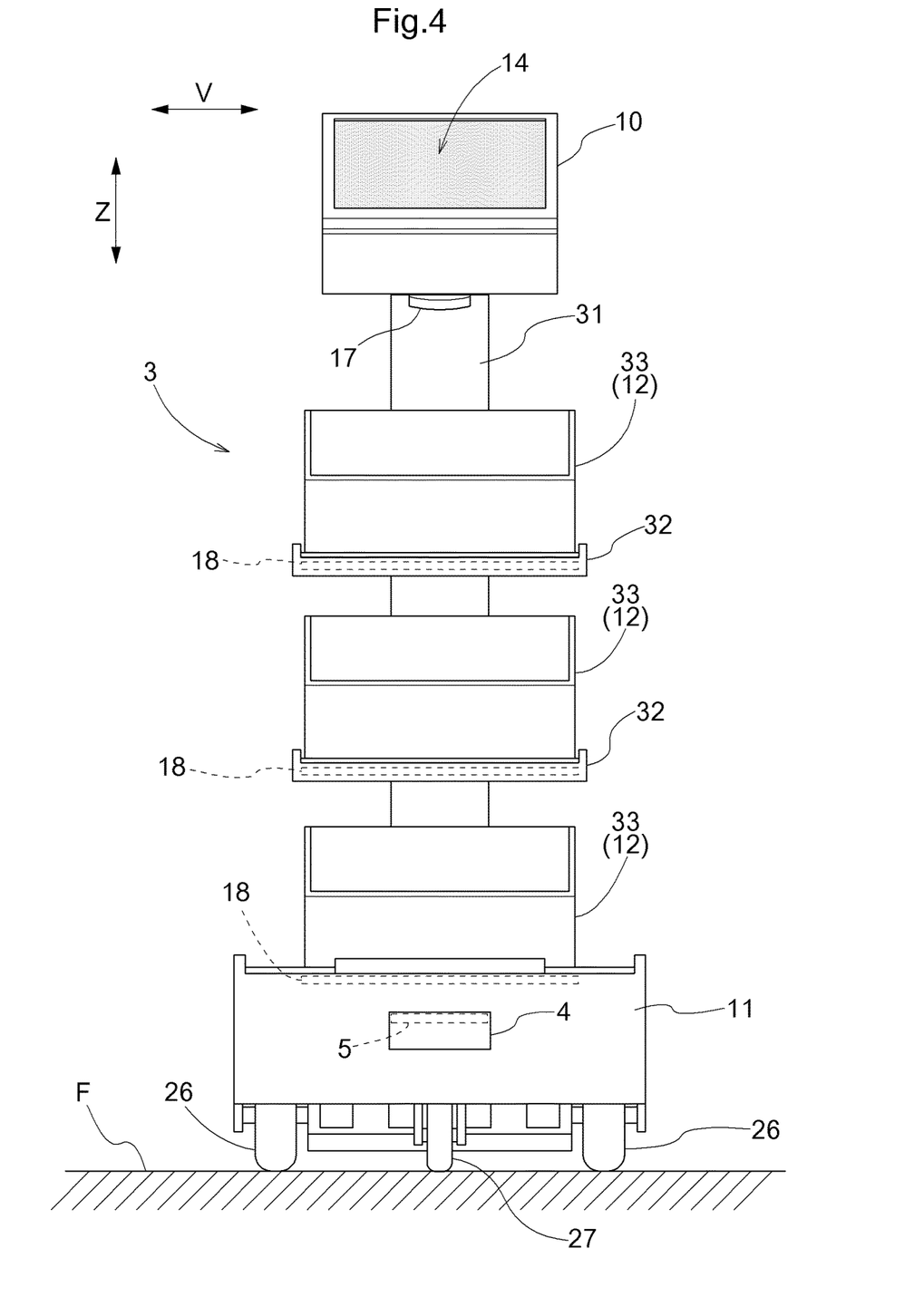
FIG. 4 is a rear view of the article transport vehicle.
Figure 5:
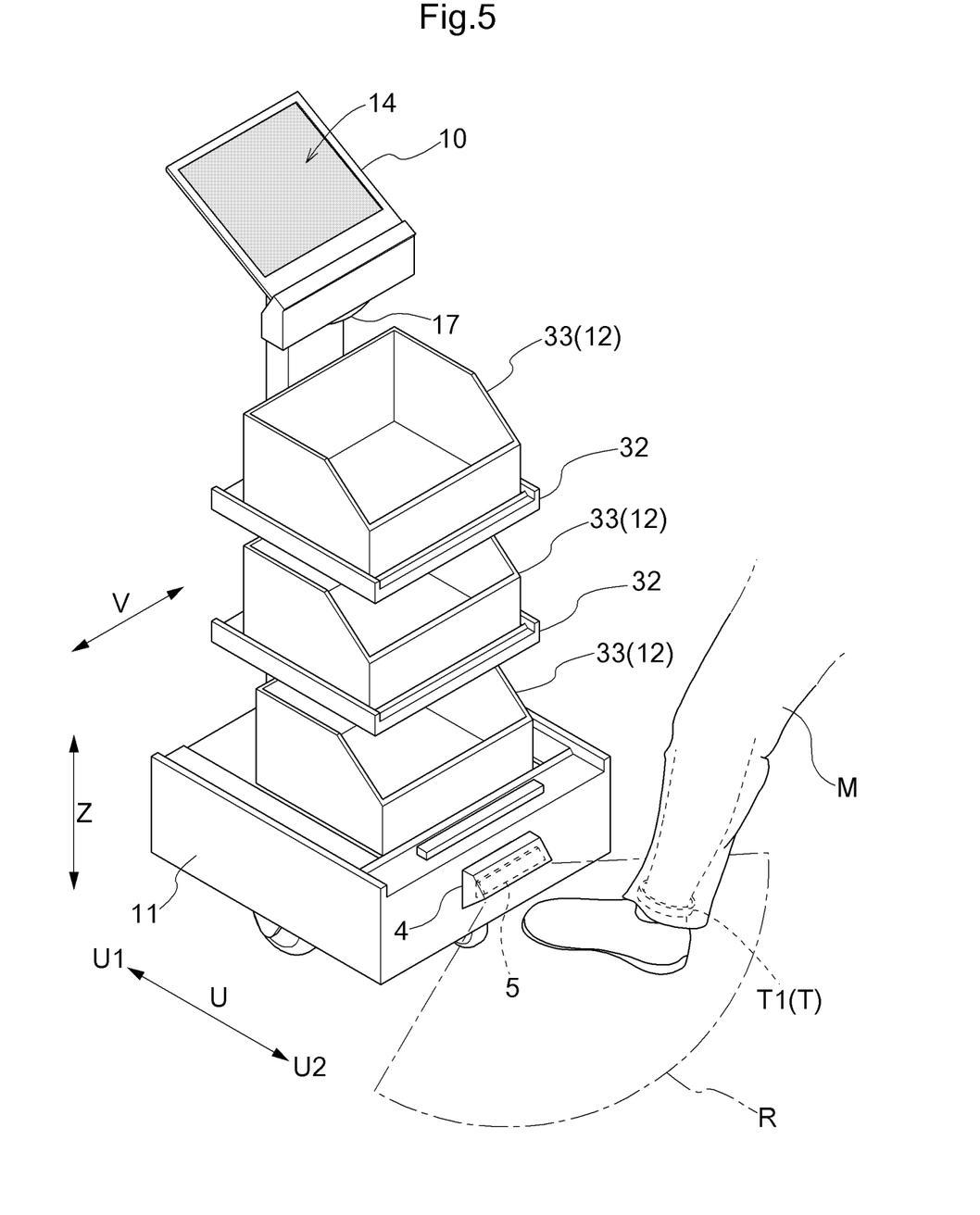
FIG. 5 is a rear perspective view of the article transport vehicle.

Hereinafter, embodiments of an article transport vehicle used for a picking facility will be described with reference to the drawings. FIG. 1 is a plan view of a picking facility 100 seen from above in an up-down direction Z, and FIG. 2 is a perspective view of the picking facility 100 seen from obliquely above. FIG. 3 is an enlarged perspective view of the picking facility 100 and an article transport vehicle 3. FIG. 4 is a rear view (a view seen from a rear side U2 that will be described below) of the article transport vehicle 3, and FIG. 5 is a rear perspective view of the article transport vehicle 3. The picking facility 100 includes an article storage shelf 2 provided with a plurality of storing units 1 for storing articles B, and the article transport vehicle 3 traveling on a floor surface F. Further, as will be described below with reference to FIG. 7, the picking facility 100 also includes a control device H for managing the articles B stored in the article storage shelf 2 and the article transport vehicle 3. As illustrated in FIGS. 1 and 2, in the picking facility 100, a plurality of operators M perform a picking operation of collecting the articles B for each sorting destination from the storing units 1 in cooperation with the article transport vehicle 3.

Hereinafter, a storing unit 1 and the article storage shelf 2 will be described with a direction in which the storing units 1 of the article storage shelf 2 are lined up seen from above being referred to as a first direction X (an array direction), and a direction orthogonal to the first direction X being referred to as a second direction Y. Further, in relation to each storing unit 1, a direction from the storing unit 1 to an aisle L in the second direction Y will be referred to as an aisle side Y1, and a direction from the aisle L to the storing unit 1 in the second direction Y will be referred to as a storing unit side Y2. Regarding the article transport vehicle 3, a traveling direction when the article transport vehicle 3 travels straight is referred to as a front-rear direction U, and a direction orthogonal to the front-rear direction U in a horizontal plane is referred to as a width direction V. In the front-rear direction U, the traveling direction side when the article transport vehicle 3 travels forward is referred to as a front side U1, and a side opposite to the traveling direction side is referred to as a rear side U2.

The article storage shelf 2 includes the storing units 1 in a state of being lined up in the up-down direction Z and the first direction X. Specifically, the article storage shelf 2 includes a plurality of shelf boards 6 at intervals in the up-down direction Z. On each shelf board 6, a plurality of storage containers 7 are placed to be lined up in the first direction X. That is, the storing units 1 are formed by the storage containers 7 included in the article storage shelf 2. A plurality of types of articles are separated by type in the article storage shelf 2, and one type of article is stored in one storing unit 1 (storage container 7).

As illustrated in FIG. 3, the storage container 7 serving as the storing unit 1 includes an opening surface 9 having an opening 8 for putting in and taking out an article B. The storage container 7 is provided in the article storage shelf 2 so that the opening surface 9 faces the aisle side Y1. The storing units 1 included in one article storage shelf 2 are arrayed with opening surfaces 9 facing in the same direction.

As illustrated in FIG. 1, the region in which the article storage shelf 2 is provided is divided into a plurality of areas E. Preferably, an operator M in charge is assigned to each of the areas E. The operator M performs the picking operation of transferring an article B from the article storage shelf 2 to the article transport vehicle 3 in the area E which the operator is in charge of. Further, the operator M may perform a replenishing operation for transferring an article B from the article transport vehicle 3 to the article storage shelf 2. Note that the relationship between the number of areas E and the number of operators M can be arbitrarily changed. For example, a plurality of operators M may be assigned to one area E, or one operator M may be in charge of a plurality of areas E.

The control device H manages the type of the articles B stored in the storing units 1, the number of articles in stock, and the like. For example, when a higher-level controller outputs a picking command for collecting articles B from the article storage shelf 2 for each sorting destination, the control device H transmits picking information to a controller 15 of the article transport vehicle 3. The picking information is information indicating the position of the storing unit 1 from which an article B is to be taken out by the picking operation performed by the operator M, and information on the type and the number of articles B to be taken out from the storing unit 1.

As illustrated in FIG. 4, the article transport vehicle 3 includes a traveler 11 that travels on the floor surface F, supporters 12 for supporting articles B, a notifier 10 for notifying the operator M of the picking information, and the controller 15 for controlling at least the traveler 11. Further, the article transport vehicle 3 includes an ID reader 4 (identification information reader) for reading identification information (operator identification information MID (see FIGS. 8 and 9)) of the operator M, a bar code reader 17 for reading a bar code (article identification information PID (see FIGS. 8 and 9)) displayed on the article B, and a weight detector 18 for measuring the total weight of the articles B supported by the supporter 12.

The traveler 11 includes a pair of traveling wheels 26 lined up in the width direction V, driven wheels 27 provided on respective sides in the front-rear direction U with respect to a line-up direction of the pair of traveling wheels 26, and a traction motor 28 (see FIG. 7) for rotationally driving the traveling wheels 26. The traveler 11 travels forward by rotating both of the traveling wheels 26 in a forward rotation direction by the traction motor 28, and travels backward by rotating both of the traveling wheels 26 in a reverse rotation direction by the traction motor 28. Further, the traveler 11 turns by rotating the pair of traveling wheels 26 at different rotational speeds by the traction motor 28. It should be noted that cases of rotating at different rotational speeds also includes the case where the rotation directions are different from each other, and the case where only one traveling wheel 26 is driven and the other traveling wheel 26 is stopped.

A support column 31 is provided upright on the traveler 11. A plurality of support bases 32 (here, two support bases 32) are supported by the support column 31. The notifier 10 is supported at an upper end of the support column 31. Transport containers 33 are respectively supported on an upper surface of the traveler 11 and on the two support bases 32. Here, an aspect in which the article transport vehicle 3 includes three transport containers 33 is illustrated, and the transport containers 33 correspond to the supporters 12 for supporting articles B.

The notifier 10 includes a display unit 14. The display unit 14 is provided so that a display screen faces the rear side U2 and an upper side. At least a part of picking information PI is displayed on the display unit 14. For example, the display unit 14 displays information such as the type of a target article, which is the target article B to be taken out from a storing unit 1, the number of articles to be taken out, a target storing unit, which is the target storing unit 1 from which the target article is taken out, and a target supporter, which is the target supporter 12 for supporting the target article. Further, it is preferred that the display unit 14 includes a touch panel so that the operator M can operate a displayed touch button. Here, an aspect in which the notifier 10 includes the display unit 14 is illustrated. However, the notifier 10 may be configured to notify the picking information PI, for example, by voice or the like without including the display unit 14.

Figure 6:
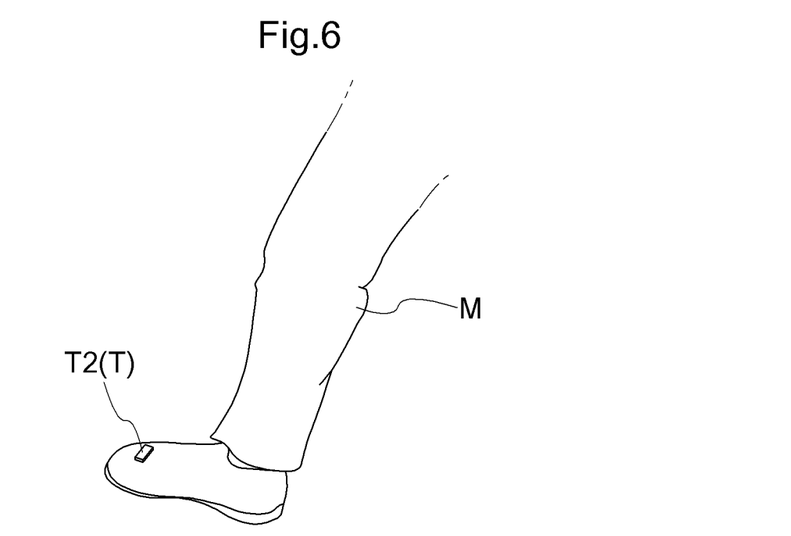
FIG. 6 is a view illustrating another example of an identification information holder.

As illustrated in FIG. 5, the operator identification information MID is attached to an identification information holder T that is worn on a foot of the operator M. The operator identification information MID is, for example, an operator number assigned to each of the operators M. FIG. 5 illustrates an anklet IC tag T1 worn on an ankle of the operator M as the identification information holder T. However, as illustrated in FIG. 6, a chip IC tag T2 included in a part of a shoe, such as a toe of the operator M, may be used as the identification information holder T. In this way, the identification information holder T can be a wireless tag (for example, an RFID tag) capable of communicating information with the ID reader 4 by wireless communication, and the ID reader 4 can be an RFID reader. In addition, the tag may be attached to a shoelace, a sock, a hem of pants, or the like. If the wireless tag is a so-called passive type, it is preferable because it can be carried by the operator M without considering a power supply. Note that, for example, when it is necessary to secure a long communicable distance, it is also preferable to use an active wireless tag that includes a power supply.

Note that the identification information holder T and the ID reader 4 are not limited to configurations for performing such wireless communication. For example, a one-dimensional or two-dimensional bar code may be displayed on a part of shoe such as the toe of the operator M, and the operator identification information MID held in the bar code may be read by the bar code reader. In this case, the one-dimensional or two-dimensional bar code corresponds to the identification information holder T, and the bar code reader corresponds to the ID reader 4.

As illustrated in FIG. 5, the ID reader 4 is provided below the supporter 12 on a side (the rear side U2) on which the operator M puts the article B into the supporter 12. Here, an aspect in which the ID reader 4 is attached to the traveler 11 is illustrated. As described above, the supporter 12 located at the lowest stage is provided on the upper surface of the traveler 11, and the ID reader 4 is provided on the traveler 11, which is located below the supporter 12 that is located at the lowest stage. However, for example, when all the supporters 12 are supported by the support column 31 erected on the traveler 11 and there is a space between the lowermost supporter 12 and the traveler 11, the ID reader 4 may be provided in the space. For example, the ID reader 4 may be supported by the support column 31.

In any case, since the ID reader 4 is provided on the lower side, the operator identification information MID can be appropriately read from the identification information holder T that is provided on the foot of the operator M. Further, since the ID reader 4 is provided on the rear side U2 on which the operator M puts the article B in, the operator M can cause the ID reader 4 to read their operator identification information MID without needless movement during the picking operation involving the act of putting the article B into the supporter 12.

As illustrated in FIG. 5, the article transport vehicle 3 further includes an emitter 5 that emits light. The emitter 5 displays a reading target area R in which reading is performed by the ID reader 4 by emitting light (visible light). FIG. 5 illustrates an aspect in which the emitter 5 displays the reading target area R on the floor surface F by emitting light on the floor surface F on which the traveler 11 travels. However, there is no limitation to this aspect, and an aspect is possible in which the reading target area R is displayed in a space by, for example, emitting the light on a mist generated by spraying mist-like water droplets, a mist in which moisture in the air has been changed into fine water droplets by spraying cooling gas, or the like. In this case, it is preferred that the article transport vehicle 3 further includes a mist generator that generates the mist.

In both the case of display on the floor surface F and the case of display in the space using mist or the like, an aspect is possible in which entry of the foot of the operator M into the reading target area R is detected by invisible light or the like, and the reading target area R is displayed with light after the detection. Further, although an aspect in which the emitter 5 is integrally provided in the ID reader 4 is illustrated here, the emitter 5 and the ID reader 4 may be separate bodies.

Although the details will be described below, the controller 15 further controls the ID reader 4, and when an article taken out from the storing unit 1 by the operator M is put in a supporter 12, the controller 15 stores the operator identification information MID of the operator M read by the ID reader 4 in a storage unit 40 (see FIG. 7) in association with the information (the picking information PI, article identification information TBID of the target article, and the like, see FIGS. 8 and 9) of the article B.

Figure 7:
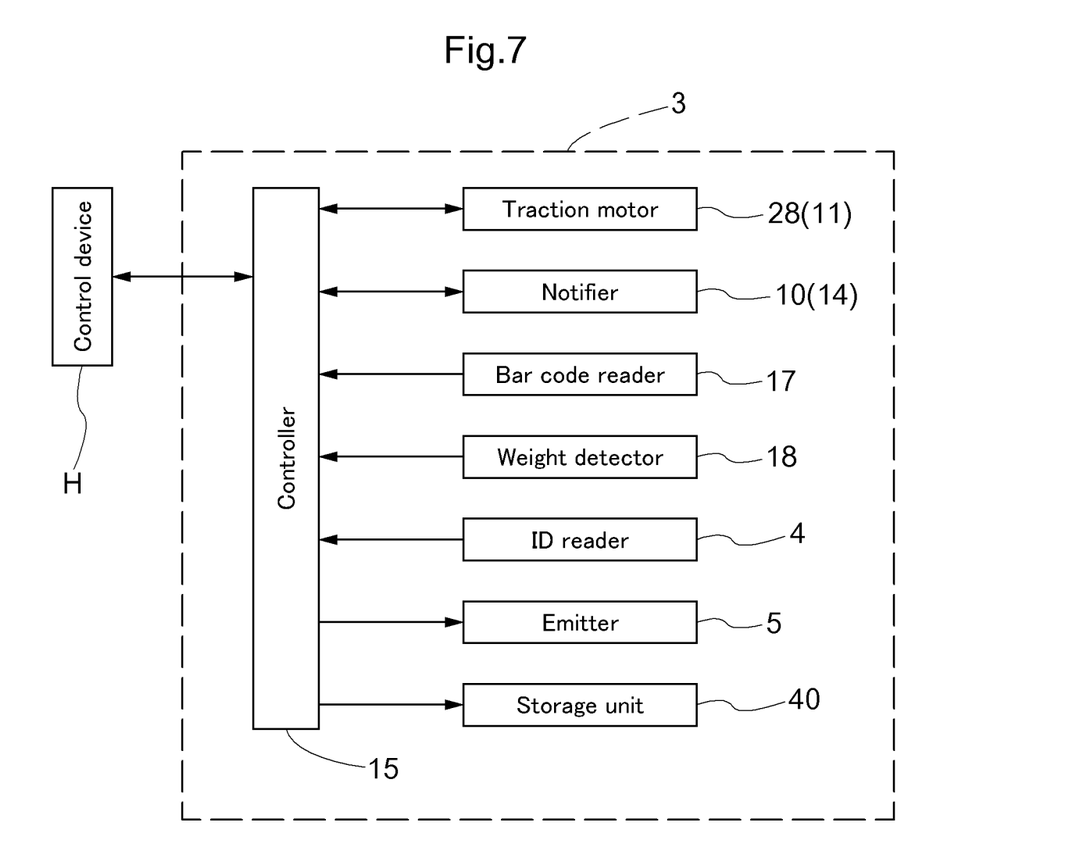
FIG. 7 is a control block diagram.

Note that FIG. 7 illustrates an aspect in which the storage unit 40 is provided in the article transport vehicle 3, however, the storage unit 40 may be provided outside the article transport vehicle 3 (in a higher-level controller such as the control device H, a server, a database, or the like). In this case, the information is transmitted from the article transport vehicle 3 to the external storage unit 40 by communication. Although the communication mode is preferably wireless communication, the information may be temporarily stored in a temporary storage medium mounted to the article transport vehicle 3, and the information may be transmitted to the external storage unit 40 by connecting the external storage unit 40 and the article transport vehicle 3 by wire. Further, there is no limitation to a wired connection, and when the temporary storage medium is a memory card or the like that can be easily removed from the article transport vehicle 3, the information may be transmitted by the temporary storage medium.

Hereinafter, a picking procedure will be described with reference to flowcharts of FIGS. 8 and 9. Upon receiving the picking information from the control device H, the controller 15 of the article transport vehicle 3 drives and controls the traction motor 28, and causes the traveler 11 to travel to any of set positions P1 set corresponding to the storing units 1 for storing the articles B. Based on a detection result of a sensor (not shown) mounted on the article transport vehicle 3, the controller 15 causes the article transport vehicle 3 to travel to the set position P1 by autonomous driving while avoiding obstacles such as the article storage shelf 2, the operator M, and other article transport vehicles 3. When the article transport vehicle 3 stops at the set position P1, the operator M in charge of the area E including the set position P1 approaches the article transport vehicle 3 and checks the picking information PI displayed on the display unit 14. The picking information PI may include information that is not displayed on the display unit 14, but the operator M is notified via the display unit 14 of at least information indicating the target article that is to be taken out from the storing unit 1 at the set position P1.

The display unit 14 shows, for example, that the storing unit 1 at a certain row in a certain column is the target storing unit from which the target article is taken out. Further, since the article transport vehicle 3 includes the three transport containers 33 as the supporters 12, the display unit 14 also shows, for example, which transport container 33 in order from the top is the target supporter 12 for the sorting destination. Furthermore, it is preferred that a name or a product code of the target article, the number of articles to be taken out, and the like are also displayed.

The operator M takes out the article B from the storing unit 1 based on the picking information PI displayed on the display unit 14, and puts the article B in the transport container 33 serving as the supporter 12. Further, the ID reader 4 is caused to read information of the identification information holder T attached to the foot of the operator M. Thereafter, when the operator M touches a touch button "Completed" or the like displayed on the touch panel of the display unit 14, the controller 15 determines that the operator M has put the article B in the supporter 12. Note that it is preferred that the touch button "Completed" or the like on the touch panel is made operable after the article B has been put in the supporter 12 and the operator identification information MID has been read. As a matter of course, it may be determined that the operator M has put the article B in the supporter 12 by detecting that the article B is supported by the support portion 12 without the operator M operating the touch button.

Figure 8:
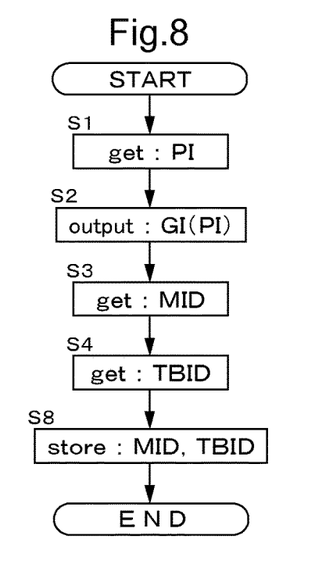
FIG. 8 is a flowchart illustrating an example of recording identification information of an operator.

As illustrated in FIG. 8, the controller 15 first receives the picking information PI from the control device H (S1). As described above, when the controller 15 receives the picking information PI (S1), the controller 15 controls the traveler 11 to move the article transport vehicle 3 to the set position P1. Here, a procedure for moving the article transport vehicle 3 is omitted, and the steps performed after the article transport vehicle 3 arrives at the set position P1 will be described (particularly step S3 and thereafter. Step S2 may be performed during movement). Further, the operation of the touch button "Completed" by the operator M is also omitted here. When the controller 15 receives the picking information PI, the controller 15 outputs image information GI based on the picking information PI to the display unit 14, and displays at least a part of the picking information PI on the display unit 14 as described above (S2).

The operator M in charge of picking approaches the article transport vehicle 3 that has arrived at the set position P1 and brings the identification information holder T close to the ID reader 4 to cause the ID reader 4 to read the operator identification information MID. The controller 15 obtains the operator identification information MID read by the ID reader 4 (S3). Further, the operator M takes out the target article, which is a designated article B, from the storing unit 1, and brings the bar code displayed on the target article close to the bar code reader 17 to cause the ID reader 4 to read the bar code. The controller 15 obtains the article identification information TBID of the target article from the bar code reader 17 (S4).

The article identification information TBID may be information included in the picking information PI instead of information read by the bar code reader 17. In this case, the article transport vehicle 3 may not include the bar code reader 17 as an article identification information reader. Further, the order of steps S3 and S4 described above may be reversed.

When the controller 15 obtains the operator identification information MID and the article identification information TBID, the controller 15 stores the information in association with each other in the storage unit 40 (S8). Here, since the target article, which is the article B to be retrieved at the set position P1, is known, the set position P1 and the operator identification information MID may be stored in step S8. Alternatively, only the operator identification information MID may be stored.

In the procedure illustrated in FIG. 8, an aspect is illustrated in which the operator identification information MID and the article identification information TBID are stored in the storage unit 40 assuming that the article identification information TBID has been read by the bar code reader 17, and the article B is supported by the supporter 12. However, as illustrated in FIG. 9, the operator identification information MID and the article identification information TBID may be stored in the storage unit 40 after more accurately determining that the article B is supported by the supporter 12.

As described above, the article transport vehicle 3 includes the weight detector 18 for detecting the total weight of the articles B supported by the supporter 12. When a new article B is supported by the supporter 12, the total weight of the articles B supported by the supporter 12 increases by the amount of the article B. Therefore, the controller 15 determines whether the total weight of the supporter 12 serving as the target supporter has increased based on the detection result of the weight detector 18, and when the total weight has increased, it is possible to determine that the article B is supported by the support unit 12 and store the operator identification information MID and the article identification information TBID in the storage unit 40.

Figure 9:
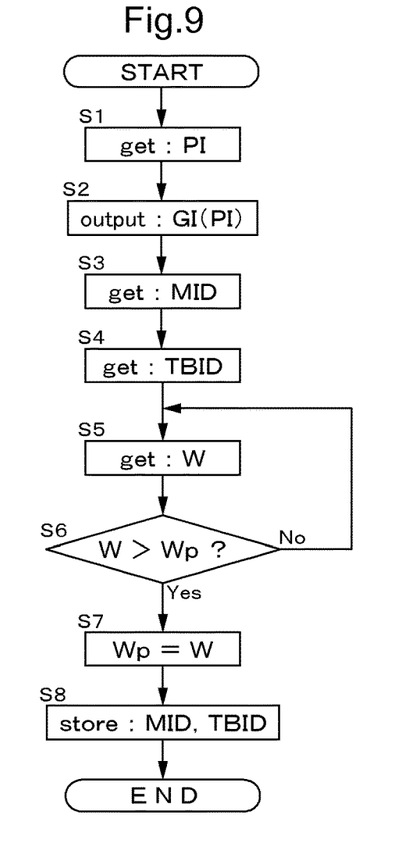
FIG. 9 is a flowchart illustrating another example of recording the identification information of the operator.

Since steps S1 to S4 of FIG. 9 are the same as those of FIG. 8, detailed description thereof will be omitted. The operator M brings the bar code of the article B taken out from the storing unit 1 close to the bar code reader 17 to read the bar code, and then puts the article B in the supporter 12. Therefore, after step S4, the controller 15 obtains the total weight W, which is the detection result of the weight detector 18 (step S5). Subsequently, a previous total weight Wp, which was the total weight W at the time when the previous picking was completed, is compared with the obtained total weight W (step S6). If the total weight W is larger than the previous total weight Wp, the controller 15 determines that the article B is supported by the supporter 12. Then, the value of the previous total weight Wp is updated to the value of the total weight W (step S7), and the operator identification information MID and the article identification information TBID are stored in the storage unit 40 (step S8). If the total weight W is not more than the previous total weight Wp, the controller 15 determines that the article B is not supported by the supporter 12, and obtains the total weight W again to make the determination again.

In FIG. 9, for simplification, an aspect in which the total weight W and the previous total weight Wp are directly compared is illustrated, however, in consideration of a detection error (referred to as "$\alpha$"), it may be determined whether the total weight W is more than "the previous total weight Wp+$\alpha$". Further, if the picking information PI includes information on the weight of the article B, it may be determined whether the total weight W has increased corresponding to the weight of the article B. Further, as described above, the total weight W is preferably obtained after the article identification information TBID is obtained (S4), but the operator identification information MID does not need to be obtained before the total weight W is obtained (S5). Therefore, in FIG. 9, step S3 may be performed after step S4, or after step S6 or step S7.

In the above, an aspect in which the controller 15 more accurately determines that the article B is supported by the supporter 12 based on the total weight W has been illustrated. However, there is no limitation to this aspect, and, for example, a sensor may be provided in the opening 8 of the storage container 7 serving as the storing unit 1, and the control unit 15 may determine that the article B is supported by the supporter 12 based on the detection result of the sensor.

Outline of Embodiment

The outline of the article transport vehicle explained above will be briefly described below.

As one aspect, the article transport vehicle includes: a traveler configured to travel to set positions that are set in correspondence with a plurality of storing units for storing articles; a supporter configured to support an article taken out from one of the storing units by an operator; and an identification information reader configured to read identification information of the operator. The identification information is held in an identification information holder attached to a foot of the operator, and the identification information reader is provided below the supporter on a side on which the operator puts the article into the supporter.

Depending on the section of the body of the operator to which the identification information holder is attached, the standing position and movement of the operator may be constrained in order to ensure that the identification information reader reads the identification information, which may reduce work efficiency. Further, depending on the size and shape of the identification information holder, the identification information holder may interfere with the movement of the operator. Since the identification information holder is attached to the foot of the operator as in this configuration, it can be less likely to interfere with the task of the operator. Further, according to this configuration, the identification information reader is provided near the foot of the operator, below the supporter, and on the side on which the operator puts the article into the supporter. Therefore, the operator can have the identification information reader read the identification information without reducing the efficiency of the task of taking out the article from the storing unit and putting the article in the supporter. As described above, according to this configuration, since the identification information of the operator can be read without reducing the work efficiency, when articles are collected from the storing units for storing the articles by using the article transport vehicle, the operator who has taken out an article from the storing unit can be appropriately identified.

Here, it is preferred that the identification information reader is attached to the traveler.

Since the traveler is provided on a lower portion of the article transport vehicle, the identification information reader can be appropriately provided below the supporter by attaching the identification information reader to the traveler.

It is preferred that the article transport vehicle further includes an emitter configured to emit light, and the emitter displays a reading target area of the identification information reader by emitting the light.

According to this configuration, the reading target area is visually notified to the operator. Therefore, it is possible to appropriately identify the operator while suppressing occurrence of erroneous reading of the identification information and preventing a decrease in work efficiency.

If the article transport vehicle includes the emitter, and the emitter displays the reading target area by emitting the light, it is preferred that the emitter displays the reading target area on a floor surface on which the traveler travels by irradiating the floor surface with the light.

Since the identification information holder is attached to the foot of the operator, the reading target area is displayed on the floor surface, so that the reading target area can be shown with high visibility to the operator.

It is preferred that the article transport vehicle further includes a controller configured to control the traveler and the identification information reader, and when the article taken out from the one storing unit by the operator is supported by the supporter, the controller stores the identification information of the operator read by the identification information reader in the storing unit in association with the information of the article.

According to this configuration, the information of the article and the identification information of the operator are stored in association with each other in the storage unit, so that the operator who has taken out the article from the storing unit can be easily identified in correspondence with each article.

DESCRIPTION OF REFERENCE SIGNS

1 Storing unit
3 Article transport vehicle
4 ID reader (Identification information reader)
5 Emitter
7 Storage container (Storing unit)
11 Traveler
12 Supporter
15 Controller
40 Storage unit
B Article
F Floor surface
M Operator
MID Operator identification information (Identification information of operator)
P1 Set position
PI Picking information (Information of article)
PID Article identification information (Information of article)
R Reading target area
T Identification information holder
T1 Anklet IC tag (Identification information holder)
T2 Chip IC tag (Identification information holder)
TBID Article identification information (Article information)
U2 Rear side (Side on which operator places article).

The invention claimed is:

1. An article transport vehicle comprising:
   a traveler configured to travel to set positions that are set in correspondence with a plurality of storing units for storing articles;
   a supporter configured to support an article taken out from one of the storing units by an operator;
   an identification information reader configured to read identification information of the operator; and
   an emitter configured to emit light,
   wherein the identification information is held in an identification information holder that is attached to a foot of the operator,
   wherein the identification information reader is provided below the supporter on a side on which the operator puts the article into the supporter, and
   wherein the emitter displays a reading target area of the identification information reader by emitting light.

2. The article transport vehicle according to claim 1, wherein the identification information reader is attached to the traveler.

3. The article transport vehicle according to claim 2, further comprising:
   a controller configured to control the traveler and the identification information reader, and
   wherein when the article taken out from the one storing unit by the operator is supported by the supporter, the controller stores the identification information of the operator read by the identification information reader in the storage unit in association with the information of the article.

4. The article transport vehicle according to claim 1, wherein the emitter displays the reading target area on a floor surface on which the traveler travels by emitting the light onto the floor surface.

5. The article transport vehicle according to claim 4, further comprising:
   a controller configured to control the traveler and the identification information reader, and wherein when the article taken out from the one storing unit by the operator is supported by the supporter, the controller stores the identification information of the operator read by the identification information reader in the storage unit in association with the information of the article.

6. The article transport vehicle according to claim 1, further comprising:
a controller configured to control the traveler and the identification information reader, and
wherein when the article taken out from the one storing unit by the operator is supported by the supporter, the controller stores the identification information of the operator read by the identification information reader in the storage unit in association with the information of the article.

7. An article transport vehicle comprising:
a traveler configured to travel to set positions that are set in correspondence with a plurality of storing units for storing articles;
a supporter configured to support an article taken out from one of the storing units by an operator; and
an identification information reader configured to read identification information of the operator,
wherein the supporter includes at least one rectangular transport container as viewed in an up-down direction,
wherein the at least one transport container has on a side surface a side opening through which the operator puts the article into the at least one transport container,
wherein the identification information is held in an identification information holder that is attached to a foot of the operator, and
wherein the identification information reader is provided below the supporter and on a first side of the traveler that is the same side as a first side surface of the at least one transport container that includes the side opening, and
the identification information reader is configured to read the identification information in response to the identification information holder being on the first side of the at least one transport container and not to read the identification information in response to the identification information holder being on any side of the at least one transport container which side is other than the first side.

8. The article transport vehicle according to claim 7, wherein the at least one transport container includes a plurality of transport containers arranged in the up-down direction, and
each mutually adjacent two of the plurality of transport containers are apart from each other with a gap in-between that is larger on the first side than on said any side.

* * * * *